Patented Jan. 16, 1945

2,367,496

UNITED STATES PATENT OFFICE 2,367,496

METHOD OF IMPROVING THE DECOLORIZING PROPERTIES OF A SYNTHETIC HYDRATED MAGNESIUM SILICATE DECOLORIZING MATERIAL

Alexander Greentree, South Charleston, W. Va., assignors, by mesne assignments, to Lyle Caldwell, Los Angeles, Calif.

No Drawing. Application May 12, 1941,
Serial No. 393,118

16 Claims. (Cl. 252—299)

This invention relates to a process for the production of a decolorizing material, and pertains particularly to the production of an improved decolorizing material or adsorbent from a synthetic hydrated magnesium silicate of the type characterized by those produced according to the teachings of U. S. Patents Nos. 2,076,545, 2,163,525, 2,163,526, and 2,163,527 granted to Lyle Caldwell.

One of the particular objects of this invention is to provide a process for the preparation of a decolorizing or adsorbent material of enhanced decolorizing power from a synthetic hydrated magnesium silicate material which itself has important adsorbent characteristics.

A further object of the invention is to provide an improved decolorizing material of the character described, containing an iron compound in a preferred proportion.

I am aware of the fact that prior investigators in the art have proposed the treatment of an oil with a mixture of a soluble iron compound and a decolorizing material of the character of fuller's earth, whereby the iron compound functions as an electrolyte to facilitate the agglomeration of contaminant coloring matter in the oil; I am further appreciative of the fact that it has been suggested that a clay material may be caused to have improved properties with respect to the removal of sulphur and sulphur compounds from petroleum oils, by the incorporation therein of soluble compounds of metals having an affinity for sulphur, followed, if desired, by a roasting treatment to convert such metals to the oxide form.

The essential concept of my invention is that of incorporating a soluble iron compound with a particular type of adsorbent material, i. e., a finely divided synthetic hydrated magnesium silicate, preferably using a ferrous compound under conditions such as will convert the principal proportion of the iron of the ferrous compound from ferrous to ferric condition, for the specific purpose of improving the decolorizing property of the material. I have found that similar treatment of base materials other than a synthetic hydrated magnesium silicate is not productive of equivalent results, and, further, that incorporation of the iron compound in ferrous condition with concurrent or subsequent at least partial oxidation is materially more effective in enhancing the decolorizing characteristics of the synthetic magnesium silicate base material than is the incorporation of an iron compound in ferric condition. The physical or chemical reasons for these observed facts are not at present apparent to me.

A specific example of the practice of my invention is as follows:

To a slurry of 24 parts (dry basis) of a finely divided synthetic hydrated magnesium silicate and 136 parts of water, I add 1.2 parts of $FeCl_2$ dissolved in 9 parts of water. The resulting slurry is thoroughly mixed and dried in contact with atmospheric or other oxygen, to a preferred moisture content, which may be varied between zero and 20% in the same manner and for the same reasons as are encountered in the production of any inorganic adsorbent material as is well known in the art.

In the above example, 5% of the ferrous salt (equivalent to 2.2% Fe) on the basis of the dry base material (synthetic hydrated magnesium silicate) was employed. I have found that the amount of $FeCl_2$ added may be varied between 0.6 part (2½%) and 3 parts (12½%), with the optimum at about 1.2 parts. The equivalent Fe range is from 1.1% to 5.5%, with an optimum at about 2.2%. I have found that $FeSO_4$ (added as $FeSO_4.7H_2O$ for example) is a full equivalent of $FeCl_2$, and tests indicate that sparingly soluble ferrous compounds may also be used, for example, ferrous oxalate. The above-recited Fe range of 1.1% to 5.5% is based on the amount of iron present in the contacting iron salt solution in proportion to the dry weight of the synthetic hydrated magnesium silicate employed. In the finished iron-treated, dried product, this corresponds generally to an iron proportion of from about 1% to about 5%, on a moisture-free basis. A more preferred range, in which the objects of the present invention are attained to the greatest degree, is a final iron content of from about 2% to about 2.5%, on a moisture-free basis. The concentration of the ferrous compound in solution seems not to be critical, and the slurry concentration may be varied within economic limits as to facility of intermixing on the one hand and the necessity for drying on the other hand, without detriment to the properties of the finished product.

During the contact of the base material (the synthetic hydrated magnesium silicate) with the iron salt in aqueous solution, the iron salt becomes intimately associated with the particles of synthetic base material. Whether the iron compound reacts chemically therewith, or is merely adsorbed thereon, is not at this time known, but tests on the contacted base material, prior to drying, indicate that this intimate association is substantially non-reversible. Extraction with water, for example, gives a negative iron test. Since the iron salt is applied to contact with the base material when in water solution, however, this intimate association may be the result of any one or any combination of the following possibilities:

(1) Chemical reaction has taken place between the silicate material and the iron salt, in the production of an insoluble iron reaction product;

(2) The iron salt has undergone chemical transformation, as by hydrolysis, which transformation might be facilitated by the tremendous surface area of the silicate material; and/or (3) The iron salt is so strongly adsorbed on the silicate material that it cannot be desorbed in water to an extent which will permit detection.

To ascribe the observed results as resultant primarily from any particular one of these possibilities is quite difficult. It has been determined, however, that when a ferrous salt is employed in the treatment of the synthetic silicate material, the final product when dried in the air contains only ferric iron; when oxygen-containing air is excluded from the drying operation, however, approximately three-fourths of the iron is found to be in ferric condition, indicating that an appreciable oxidation is obtained during the contact step. This would point to possibility (2) above. The decolorizing characteristics of the three-quarters oxidized and fully oxidized products were equivalent.

Considerable improvements in the decolorizing properties of a synthetic hydrated magnesium silicate decolorizing material may be obtained by treating the base material with a water-soluble ferric salt in water solution, as with ferric chloride or the like. The improvement resulting from treatment with $FeCl_3$ in the manner set forth above in the case of $FeCl_2$, is approximately 50% of that obtained with $FeCl_2$ or $FeSO_4$. A further improvement may be effected by treating the base material with a $FeCl_3$ solution, for example, followed by contact with an alkali-metal hydroxide solution to convert the Fe of the $FeCl_3$ to $Fe(OH)_3$, followed by drying. This results in an improvement in the decolorizing properties approximately 50% greater than that obtained with the straight $FeCl_3$ plus drying procedure.

Typical data on the effect of varying quantities of ferrous salt on the bleaching efficiency of the product, for the bleaching of two different cottonseed oils, are as follows:

| Per cent Fe used in making adsorbent product (dry basis) | Lovibond colors Y-R | | | |
|---|---|---|---|---|
| | Cottonseed oil No. 1 (2% of adsorbent) | | Cottonseed oil No. 2 (1% of adsorbent) | |
| | Yellow | Red | Yellow | Red |
| 0.0 | 25 | 3.6 | 25 | 2.9 |
| 1 | 25 | 3.3 | 25 | 2.3 |
| 2 | 25 | 2.2 | 25 | 2.1 |
| 4.4 | 25 | 3.4 | 25 | 2.3 |
| Orig. oil | 35 | 10.5 | 35 | 5.1 |

Contact—10 min. at 230° F.

A significant property of adsorbents prepared according to this invention is that of readily reducing the color of highly colored oils to a commercially satisfactory level, while in the case of ordinary clays no practical amount will so reduce the color. The following table expresses this property, in terms of Lovibond scale colors, using various amounts of adsorbent, at a ten minute contact, 230° F. treatment for each. The "natural" clay is one of the most widely used natural clays in the United States, and the "present adsorbent" is a synthetic hydrated magnesium silicate treated with 9% $FeSO_4$ (3.2% Fe).

| Per cent adsorbent used | Lovibond colors | | | |
|---|---|---|---|---|
| | Using natural clay | | Using present adsorbent | |
| | Yellow | Red | Yellow | Red |
| 0 | 35 | 11.7 | 35 | 11.7 |
| 1 | 35 | 6.5 | 30 | 4.7 |
| 2 | 35 | 4.9 | 30 | 3.1 |
| 3 | 35 | 4.5 | 20 | 2.1 |
| 6 | 25 | 3.4 | | |

From the above, those skilled in the art will recognize that the color reduction obtained by using as much as 6% of the natural decolorizing clay is not sufficiently great to meet commercial demands for a properly decolorized oil, while the color improvement with but 3% of the material prepared according to this invention is well within the range of commercial requirements. In general, in treating an oil such that a satisfactory color can be obtained with a natural clay if a sufficient amount is employed, I have found that one must use from 1.5 to 3 times, depending upon the oil being treated, as much natural clay to secure the same color reduction as is obtainable with a nominal amount of the adsorbent of this invention.

The above examples of the practice of this invention are to be taken as illustrative rather than limitative, the scope of this invention being expressed in the subjoined claims. The method of decolorizing vegetable oils, by contact thereof with the improved decolorizing composition described herein, is described and claimed in a patent application filed by me on November 24, 1944, Ser. No. 564,977.

I claim:

1. The method of increasing the decolorizing properties of a synthetic hydrated magnesium silicate decolorizing material, which comprises subjecting such a material in finely divided condition to contact with a water-soluble iron salt in aqueous solution, to cause such iron salt to become intimately associated with the particles of said material, and drying the contacted material, the proportion of said iron salt to said material being such that the final product contains from about 1% to about 5% of iron on a dry weight basis.

2. The method set forth in claim 1, in which the proportion of said iron salt to said silicate is such that the final product contains about 2% to 2½% of iron.

3. The method of increasing the decolorizing properties of a synthetic hydrated magnesium silicate decolorizing material, which comprises subjecting such a material in finely divided condition to contact with a water-soluble ferrous salt in aqueous solution, to cause such ferrous salt to become intimately associated with the particles of said silicate material, and drying the contacted material, such ferrous salt being employed in a proportion such that the final product contains from about 1% to about 5% of iron on a dry weight basis.

4. The method set forth in claim 3, in which the proportion of ferrous salt employed is such that the final product contains about 2% to 2½% of iron.

5. The method of increasing the decolorizing properties of a synthetic hydrated magnesium silicate decolorizing material, which comprises subjecting such a silicate material in finely divided condition to contact with a water-soluble ferrous salt in aqueous solution, to cause such ferrous salt to become intimately associated with the particles of said silicate material, and drying the contacted material under conditions causing oxidation of the principal proportion of such ferrous iron to ferric condition, such ferrous salt being employed in a proportion such that the final product contains from about 1% to about 5% of iron on a dry weight basis.

6. The method set forth in claim 5, in which the proportion of ferrous salt employed is such that the final product contains about 2% to 2½% of iron.

7. The method of increasing the decolorizing properties of a synthetic hydrated magnesium silicate decolorizing material, which comprises subjecting such a silicate material in finely divided condition to contact with a water soluble ferric salt in aqueous solution, to cause such ferric salt to become intimately associated with the particles of said silicate material, and drying the contacted material, the proportion of said ferric salt to said silicate being such that the final product contains from about 1% to about 5% of iron on a dry weight basis.

8. The method set forth in claim 7, in which the proportion of ferric salt employed is such that the final product contains about 2% to 2½% of iron.

9. The method of increasing the decolorizing properties of a synthetic hydrated magnesium silicate decolorizing material, which comprises subjecting such a silicate material in finely divided condition to contact with a water-soluble ferric salt in aqueous solution, subsequently subjecting the so-contacted material to contact with an alkali-metal hydroxide to cause precipitation of ferric hydroxide within said silicate material, and drying the contacted material, the proportion of said ferric salt to said silicate being such that the final product contains from about 1% to about 5% of iron on a dry weight basis.

10. The method set forth in claim 9, in which the proportion of ferric salt employed is such that the final product contains about 2% to 2½% of iron.

11. The method of increasing the decolorizing properties of a synthetic hydrated magnesium silicate decolorizing material, which comprises subjecting such a material in finely divided condition to contact with a sulphate of iron in aqueous solution, to cause said sulphate of iron to become intimately associated with the particles of said material, and drying the contacted material, the proportion of said sulphate of iron to said material being such that the final product contains from about 1% to about 5% of iron on a dry weight basis.

12. The method of increasing the decolorizing properties of a synthetic hydrated magnesium silicate decolorizing material, which comprises subjecting such a material in finely divided condition to contact with a chloride of iron in aqueous solution, to cause said chloride of iron to become intimately associated with the particles of said material, and drying the contacted material, the proportion of said chloride of iron to said material being such that the final product contains from about 1% to about 5% of iron on a dry weight basis.

13. The method of increasing the decolorizing properties of a synthetic hydrated magnesium silicate decolorizing material, which comprises subjecting such a material in finely divided condition to contact with ferrous sulphate in aqueous solution, to cause such ferrous sulphate to become intimately associated with the particles of said material, and drying the contacted material, such ferrous sulphate being employed in a proportion such that the final product contains from about 1% to about 5% of iron on a dry weight basis.

14. The method of increasing the decolorizing properties of a synthetic hydrated magnesium silicate decolorizing material, which comprises subjecting such a material in finely divided condition to contact with ferrous sulphate in aqueous solution, to cause such ferrous sulplate to become intimately associated with the particles of said material, and drying the contacted material under conditions to cause oxidation of the principal proportion of the iron to ferric condition, such ferrous sulphate being employed in a proportion such that the final product contains from about 1% to about 5% of iron on a dry weight basis.

15. The method of increasing the decolorizing properties of a synthetic hydrated magnesium silicate decolorizing material, which comprises subjecting such a material in finely divided condition to contact with ferrous chloride in aqueous solution, to cause such ferrous chloride to become intimately associated with the particles of said material, and drying the contacted material, such ferrous chloride being employed in a proportion such that the final product contains from about 1% to about 5% of iron on a dry weight basis.

16. The method of increasing the decolorizing properties of a synthetic hydrated magnesium silicate decolorizing material, which comprises subjecting such material in finely divided condition to contact with ferrous chloride in aqueous solution, to cause such ferrous chloride to become intimately associated with the particles of said material, and drying the contacted material under conditions to cause oxidation of the principal proportion of the iron to ferric condition, such ferrous chloride being employed in a proportion such that the final product contains from about 1% to about 5% of iron on a dry weight basis.

ALEXANDER GREENTREE.